United States Patent [19]

Aung

[11] Patent Number: 5,279,658
[45] Date of Patent: Jan. 18, 1994

[54] COMPOSITION SUITABLE FOR FORMING INTO SHAPED ARTICLES, PROCESS FOR PREPARING THE COMPOSITION, PROCESS FOR PREPARING SHAPED ARTICLES USING THE COMPOSITION, AND SHAPED ARTICLES SO-FORMED

[76] Inventor: David Aung, 7 Kimbercroft Court, Scarborough, Ontario, Canada, M1S 4K7

[21] Appl. No.: 761,221

[22] Filed: Sep. 19, 1991

[51] Int. Cl.$^5$ .................... C08L 89/00; C08L 3/02
[52] U.S. Cl. .................... 106/154.1; 106/153; 106/157; 106/213
[58] Field of Search .................... 106/213, 153, 154.1, 106/157

[56] References Cited

U.S. PATENT DOCUMENTS

| | | | |
|---|---|---|---|
| 2,347,849 | 5/1944 | Selberlich | 127/33 |
| 2,424,546 | 9/1943 | Bauer et al. | 106/213 |
| 3,243,308 | 3/1966 | Barger et al. | 106/213 |
| 3,366,486 | 1/1968 | Weinstein et al. | . |
| 3,549,619 | 12/1970 | Mark et al. | . |
| 3,775,144 | 11/1973 | Ware et al. | 106/213 |
| 4,863,655 | 9/1989 | Lacourse et al. | 264/53 |
| 5,035,930 | 7/1991 | Lacourse et al. | 428/35.6 |
| 5,043,196 | 8/1991 | Lacourse | 428/35.6 |
| 5,059,642 | 10/1991 | Jane et al. | . |
| 5,153,037 | 10/1992 | Altieri | 428/35.6 |

FOREIGN PATENT DOCUMENTS

| | | |
|---|---|---|
| 7215591 | 9/1991 | Australia . |
| 654605 | 4/1965 | Belgium . |
| 657909 | 7/1965 | Belgium . |
| 0087847 | 9/1983 | European Pat. Off. . |
| 0118240 | 9/1984 | European Pat. Off. . |
| 0304401 | 2/1989 | European Pat. Off. . |
| 355250 | 2/1989 | European Pat. Off. . |
| 0370913 | 5/1990 | European Pat. Off. . |
| 0376201 | 7/1990 | European Pat. Off. . |
| 0474095 | 3/1992 | European Pat. Off. . |
| 7807062 | 6/1979 | Netherlands .................... 106/213 |
| 9014938 | 12/1990 | PCT Int'l Appl. . |
| 9112186 | 8/1991 | PCT Int'l Appl. . |
| 3415 | 2/1910 | United Kingdom .................... 106/213 |
| 207037 | 11/1923 | United Kingdom .................... 106/157 |
| 2029836 | 9/1978 | United Kingdom . |

OTHER PUBLICATIONS

Chemical Abstracts, vol. 88, No. 13, (1978) Ohio, U.S.A. Abstract No. 87884e, p. 384, column L Database WPIL, Week 8702, Derwent Publications Ltd., London GB, AN 87-012516 (Dec. 1986).
Starke, vol. 22, No. 9, (1970) Weinhein DE, pp. 309-313.
Modern Plastics, Mid-October Encyclopedia Issue (1990), p. 178.
BioCycle, Mar. 1989, p. 58.
K. Hannigan, "Edible Plastic," Food Engineering, Mar. 1984 pp. 95-96.
"Feeling hungry? Just eat the plate" The Toronto Sun (Sep. 6, 1991) p. 90.
"Edible dishware unveiled as styrofoam replacement" The Globe & Mail (Sep. 6, 1991).
G. Cheater, "Company develops packaging you can eat," The Globe & Mail (Jan. 5, 1991) p. A4.

Primary Examiner—David Brunsman
Attorney, Agent, or Firm—Bereskin & Parr

[57] ABSTRACT

A composition suitable for forming into shaped articles comprising flour, starch, and water. The flour, starch and water are each present in an amount such that the composition is rigid and stable over a predetermined temperature range. The composition preferably contains 40 to 80% by weight flour, 20-60% starch and 15-25% water and the flour and starch are obtained from natural cereal sources, such as corn, rice, potato, tapioca and wheat. A process of preparing the composition and a shaped article, and a shaped article produced in accordance with the process are also described. The shaped article may be used for foodstuffs.

3 Claims, 3 Drawing Sheets

COMPOSITION SUITABLE FOR FORMING INTO SHAPED ARTICLES, PROCESS FOR PREPARING THE COMPOSITION, PROCESS FOR PREPARING SHAPED ARTICLES USING THE COMPOSITION, AND SHAPED ARTICLES SO-FORMED

FIELD OF THE INVENTION

The invention relates to a composition for forming into shaped articles; a process for preparing the composition; process for preparing shaped articles using the composition; shaped articles so-formed and an apparatus for forming the composition into shaped articles.

BACKGROUND OF THE INVENTION

Disposable packaging is widely used for a variety of products, including both hot and cold convenience foodstuffs and beverages such as hamburgers, french fries, coffee, sandwiches and the like. Disposable packaging is convenient because it is inexpensive, requires no washing and can be discarded after use.

Commercially available disposable packaging suffers from a number of disadvantages, one of the most significant being environmental problems. Such packaging is typically made from oil-based plastics or other artificial materials such as polystyrene foam. These materials are not biodegradable and are disposed of in landfill sites where they accumulate and persist indefinitely as environmental contaminants. Packaging derived from paper products is manufactured using a process that requires the destruction of forest reserves and produces contaminating byproducts. Currently available disposable packaging is also expensive to produce.

Biodegradable containers have been reported for use in packaging foodstuffs. U.S. Pat. No. 3,549,619 to Mark and Mehltretter teaches a method for the preparation of amylose acetate dispersions capable of yielding edible transparent films suitable for packaging of food. The water-soluble food packaging films are produced from high amylose corn starch acetylated with acetic anhydride. The resulting corn starch acetate granules are cooked by steam jets at 177° C. to disintegrate the granules. Water-soluble food packaging films are then cast from the resulting amylose acetate aqueous dispersions. The product is a water-soluble, edible, flexible film which is especially suited to package dry foods intended to be added to liquid prior to use, such as coffee or soup.

Biodegradable polymers, such as starch, have been incorporated into oil-based plastics. A corn starch-based additive is often used at a concentration of between 6 and 15% of the final product. In the appropriate environment, such as a landfill site, microorganisms digest the starch. Bulk biodegradation occurs at concentrates approaching 50% starch but, as the percentage of starch increases there is a concomitant loss of physical properties of the plastic (See Modern Plastics Encyclopedia Mid-October 1990 issue p. 178).

United Kingdom patent application No. 2,029,836, discloses a method and composition of materials for preforming starch with a lubricating fluid into pellets for use in the extrusion of biodegradable plastic. However, so called biodegradable plastics are comprised of traditional oil-based plastic polymers loaded with starch or other rapidly decomposing material as a binder. The binding material breaks down rapidly but leaves small particles of the plastic polymer which are not biodegradable. The oil-based plastics blended with biodegradable materials such as starch have not gained commercial acceptance because they are not fully biodegradable and they are expensive to produce.

Natural polymers which can be processed by conventional plastics technology have been obtained as fermentation products from single cell microorganisms. Biocycle, March 1989, p. 58 discloses the isolation of a biodegradable polymer poly(3-hydroxybutyrate-3 hydroxyvalerate). However, the polymer is expensive to produce and can not compete commercially with oil-based plastics.

Biodegradable containers which disintegrate when placed in the ground are known for use in plant cultivation and transplantation. These biodegradable plant transplanter containers may be manufactured from polymers such as polylactones or oxyalkanoyl polymers and naturally occurring biodegradable material such as rice hulls, brewers yeast, fir bark or cellulosic products. European Patent Application No. 355,250 discloses a porous container for plant cultivation prepared by mixing rice grain husks with water and a polyurethane prepolymer, moulding to the desired shape and air drying.

There is a need for biodegradable packaging material derived from natural products which is environmentally friendly and prepared by a commercially useful process. In particular there is a need for biodegradable packaging suitable for packaging a wide variety of foodstuffs including hot and cold liquids and hot foods with a high fat content, such as hamburgers and french fries.

SUMMARY OF THE INVENTION

The present invention provides a composition suitable for forming into shaped articles comprising flour, starch, and water, said flour, starch and water each being present in an amount such that said composition is rigid and stable over a predetermined temperature range.

Preferably the composition contains 40 to 80% by weight flour, 20–60% by weight starch and 15–25% by weight water and the flour and starch are obtained from natural cereal sources, such as corn, rice, potato, tapioca and wheat. Preferably the particle size of the flour and starch is in the range of about 150–250 mesh and the moisture content is in the range of about 8.0–15% by weight and 10–23% by weight, respectively. The composition may also contain additives such as softening agents, firming agents, colouring agents, flavouring agents, anti-sticking agents, anti-staling agents and antioxidants depending on the desired result to be achieved.

Most preferably the flour, starch and water are each present in an amount in the composition such that the composition has a compression strength of 10 to 60 MPa when measured by a test conducted in accordance with ASTM D-695, an insulating capability of 1.2 to 4.5 cal. cm2/s.cm.c when measured by a test conducted in accordance with ASTM C-177, a thickness of about 80 to 250 mil (about 1.016–5.080 mm) when measured by a test conducted in accordance with ASTM D-1005-84, a moisture content of 10–19% by weight when measured by a test conducted in accordance with AACC 44-15A, a degree of expansion of 300–500% when measured by a test conducted in accordance with ASTM D-1005-84, and/or a density of about 0.06–0.8 g/cc when measured by a test conducted in accordance with ASTM D-792-86.

The invention also relates to a process for preparing a composition suitable for forming into shaped articles comprising preparing a mixture of flour and starch wherein the flour and starch have a uniform particle size; and heating and mixing the mixture under a sufficient pressure, temperature and moisture content and for a sufficient period of time such that when the pressure is decreased the mixture expands to form a composition which when cooled is rigid and stable over a predetermined temperature. Preferably the mixture of flour and starch is prepared using 40 to 80% by weight flour and 20-60% by weight starch and the flour and starch are obtained from natural cereal sources, such as corn, rice, potato, tapioca and wheat. Preferably the particle size of the flour and starch is in the range of about 150-250 mesh and the original moisture content of the flour and starch is in the range of about 8.0-15% by weight and 10-23% by weight, respectively. Additives such as softening agents, firming agents, anti-sticking agents, anti-staling agents; colouring agents, flavouring agents and anti-oxidants may be added at any step in the process depending on the desired result to be achieved.

A shaped article may be formed using the composition of the invention by injecting the composition into a molding press and forming the composition into a shaped article. The shaped article may then be coated with a water-repellant coating.

The properties of the composition of the invention make it suitable for making shaped articles to contain foodstuffs. In particular, the composition of the invention may be entirely composed of natural edible ingredients such as flour and starch and accordingly is biodegradable and edible. It will be appreciated that the addition of minor amounts of additives to the composition of the invention will not significantly affect the biodegradable and edible properties of the composition. The composition of the invention is also rigid, light weight, and stable over a temperature range of about $-40°$ C. to $160°$ C., has a compression strength of 10 to 60 MPa when measured by a test conducted in accordance with ASTM D-695 and an insulating capability of 1.2 to 4.5 cal. cm2/s.cm.c when measured by a test conducted in accordance with ASTM C-177, a thickness of about 80 to 250 mil (about 1.016-5.080 mm) when measured by a test conducted in accordance with ASTM D-1005-84, a moisture content of 10-19% by weight when measured by a test conducted in accordance with AACC 44-ISA, degree of expansion of 300-500% when measured by a test conducted in accordance with ASTM D-1005-84, and/or a density of about 0.06-0.8 g/cc when measured by a test conducted in accordance with ASTM D-792-86. The composition of the invention is thus suitable for direct contact with foods, would be useful for forming into shaped articles for containing hot water-based liquids and has a practical shelf life. The invention also provides a commercially useful process for preparing the composition and shaped articles of the invention.

The invention further provides a shaped article produced using the composition of the invention and most preferably a shaped article produced by the process of the invention.

The invention also relates to an apparatus for forming a composition comprising flour, starch and water, into a shaped article, the apparatus comprising (1) a cooking device for cooking the composition at an elevated temperature and pressure and having an outlet for the cooked composition; and (2) a die means having an inlet connected to the outlet of the cooking device and defining said shaped article. Preferably, the cooking device of the apparatus comprises a cooker extruder device having an extruder outlet, through which the cooked composition passes. The apparatus may include pump means connected between the outlet of the cooking device and the inlet of the die means for pumping the cooked composition into the die means. The die means may also include means for heating and means for cooling an article formed therein.

BRIEF DESCRIPTION OF THE DRAWINGS

As hereinbefore mentioned, the invention will be better understood with reference to the drawings in which.

DETAILED DESCRIPTION OF INVENTION

As hereinbefore mentioned the present invention provides a composition suitable for forming into shaped articles comprising flour, starch, and water, said flour, starch and water each being present in an amount such that a shaped article formed from said composition is rigid and stable over a predetermined temperature range.

Preferably the composition contains 40 to 80% by weight flour, 20-60% starch and 15-25% water and the flour and starch are obtained from natural cereal sources, such as corn, rice, potato, tapioca and wheat. A variety of additives may be used in the composition depending on the desired result. Examples of suitable additives are provided in Table I. For further examples of suitable additives see R. S. Igoe, *Dictionary of Food Ingredients*, Van Nostrand Reinhold, New York, 2nd Ed., 1989; and R. J. Lewis Sr., *Food Additives Handbook*, Van Nostrand Reinhold, New York, 1989.

Most preferably the flour, starch and water are each present in an amount in the composition such that a shaped article formed from the composition has a compression strength of 10 to 60 MPa when measured by a test conducted in accordance with ASTM D-695, an insulating capability of 1.2 to 4.5 cal. cm2/s.cm.c when measured by a test conducted in accordance with ASTM C-177, a thickness of about 80 to 250 mil (about 1.016-5.080 mm) when measured by a test conducted in accordance with ASTM D-1005-84, a moisture content of 10-19% by weight when measured by a test conducted in accordance with AACC 44-I5A, a degree of expansion of 300-500% when measured by a test conducted in accordance with ASTM D-1005-84, and/or a density of about 0.06-0.8 g/cc when measured by a test conducted in accordance with ASTM D-792-86.

The composition of the invention may be in pellet form or any other form suitable for employing in a process for preparing shaped articles.

As hereinbefore mentioned, the invention also relates to a process for preparing a composition suitable for forming into shaped articles comprising preparing a mixture of flour and starch wherein the flour and starch have a uniform particle size; and heating and mixing the mixture under a sufficient pressure, temperature and moisture content and for a sufficient period of time such that when the pressure is decreased the mixture expands to form a composition which when cooled is rigid and stable over a predetermined temperature. Preferably the mixture of flour and starch is prepared using 40 to 80% by weight flour and 20-60% by weight starch and the flour and starch are obtained from natural cereal sources, such as corn, rice, potato, tapioca and wheat. Preferably the particle size of the flour and starch is in the range of about 150-250 mesh and the original moisture content of the flour and starch is in the range of about 8.0-15% by weight and 10-23% respectively. Additives such as softening, firming, anti-sticking, and anti-staling agents and anti-oxidants may be added at any step in the process depending on the desired result to be achieved.

As hereinbefore mentioned the composition of the invention may be in pellet form. Preferably, the pellet is formed by preparing a mixture of flour and starch wherein the flour and starch have a uniform particle size, heating and mixing the mixture under sufficient pressure, temperature and moisture content and for a sufficient period of time such that the resulting material does not expand when it is extruded from an extrusion cooker. Preferably the moisture content is 10-12%, the temperature is 240°-280° F. and the pressure is 50-100 psi.

A shaped article may be formed using the composition of the invention by injecting the composition into a molding press and forming the composition into a shaped article. The shaped article may then be coated with a water-repellant coating.

Figure 1:
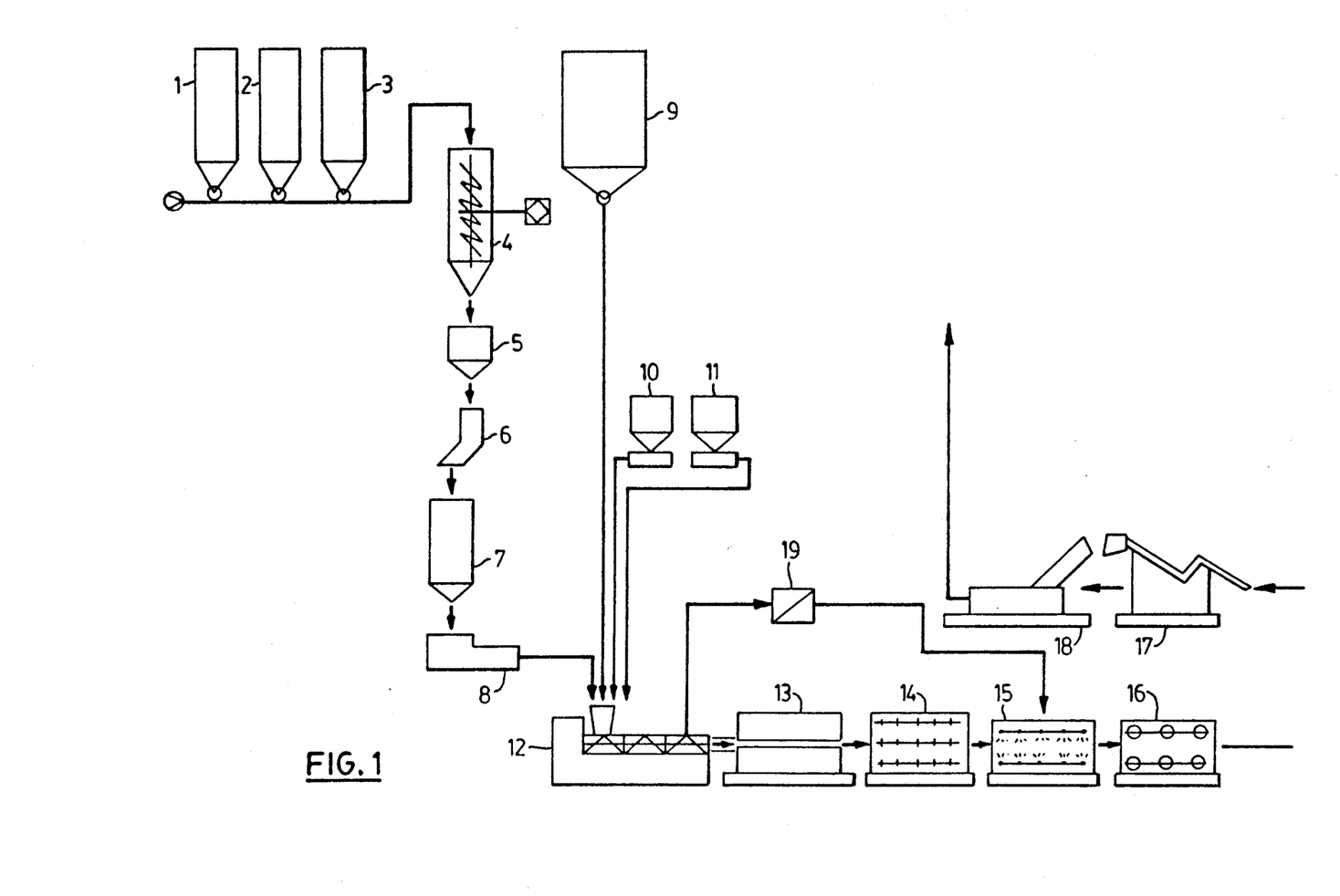
FIG. 1 is a schematic drawing showing a process for producing a rigid biodegradable, edible food container.

A preferred embodiment for producing shaped articles is shown in FIG. 1 and described below.

Feed materials, comprising flour, starch and additives are stored in feed silos 1-3. The flour and starch are obtained from natural cereal sources, such as corn, rice, potato, tapioca and wheat. The particle size of the flour and starch are preferably in the range of 150-250 mesh and the moisture content is in the range of 8.0-15% by weight and 10-23% respectively as shown in Table II. The starch may be obtained from C. Tennant, Canada and Maize, United States (corn), Rhone-Poulenc (potato); A. Stanley, United States and Nacan, Canada (tapioca); and Manildra, United States and Prescott, Canada (wheat) the flour may be obtained from J. Short, United States; Dover, Canada (corn); Comet, United States Grain Pat, Canada (rice) and North Dakota, United States and Grain Pat, Canada (wheat). As discussed above, a variety of additives may be used depending on the nature of the shaped article to be produced.

The feed materials are fed into weigh mixer 4 in the following proportions, 40-80% flour, 20-60% starch, 15 to 25% water and 0-10% additives. The mixture is sifted in a sifter 5 to provide particles of a uniform size and passed through a metal detector 6 to detect and remove any metal which may have inadvertently been incorporated into the mixture. The mixture is held in storage silo 7 before passing to a volumetric feeder 8. Water, flavouring and colouring agents are held in storage tanks 9, 10 and 11 respectively.

The flavouring agent may be one or more of a natural flavour or an artificial flavour or an artificial or a combination of natural and artificial flavours. Examples of suitable natural flavouring agents include grapefruit oil, jasmine oil, lemon oil, lime oil, orange oil and rose oil. The desired result as well as the nature of the flavouring agent will determine the actual amount used in any particular incident.

The colouring agent may be a natural or artificial colouring agent or a combination of both. The amount of colouring agent to be added can be determined by visual requirement. Natural colouring agents such as saffron, paprika, beetroot, crocein and carotene are preferably used as colouring agents.

Flavouring and colouring agents are most preferably selected from the list of Health and Welfare, Canada and the Federal Drug Agency, United States approved agents.

In the cooking phase the sifted mixture, water and any colouring and flavouring agents are fed into extrusion cooker 12 at a feed rate of 2-7 Kg/hour and a nozzle ratio of 2:4 with a single or twin screw rotating at a speed of 90-220 rpm, preferably the extrusion cooker is a MPF 50/35 extrusion cooker or a MPF 40D extrusion cooker obtained from APV Baker Inc. with a co-rotating twin screw. The dough is mixed, kneaded and cooked with a moisture content of 15-35% at a temperature of 120°-200° C. and a pressure of 200-300 psi. The pressure is reduced by venting resulting in expansion of the dough. The expanded hot dough is pressure injected into form press 13, which has a water-cooled die mould. The expanded hot dough fast cools in the form press at the surface of the cold die mould. The expanded packaging material is stamped to the correct thickness in the form press. The formed packaging material may than be coated with a water repellant, such as Methocell ® in a coater 14, (for example, a water resistance coating machine manufactured by Christy Machine Company, model: tube/cone coater; powder and liquid dispenser) dried in an oven 15 and cooled in a cooling chamber 16 (for example, a cooling/cutting machine model: Multi-zone, manufactured by Greerco). The finished product can then be processed through stacking and packing machines 17 and 18 (for example, the stacking and packing machine model Dyna-Pak manufactured by Eagle Packing) prior to shipping. A heat exchanger 19 can be incorporated into the system to conserve energy as shown in FIG. 1.

The sifted mixture optionally containing colouring and flavouring agents may be formed into pellets by feeding the mixture into the extrusion cooker 12. The operating conditions of the extrusion cooker are selected such that no puffing or expansion of the extrudant takes place in the extrusion cooker. Preferably the moisture content is 10-12%, the temperature is 240°-280° F. and the pressure is 50-100 psi. The extrudant is then cut into pellets preferably by blades at the end of the cooking extruder, and the pellets are dried and cooled to room temperature. The pellets may then be used in the process described above in place of the sifted mixture.

Figure 2:
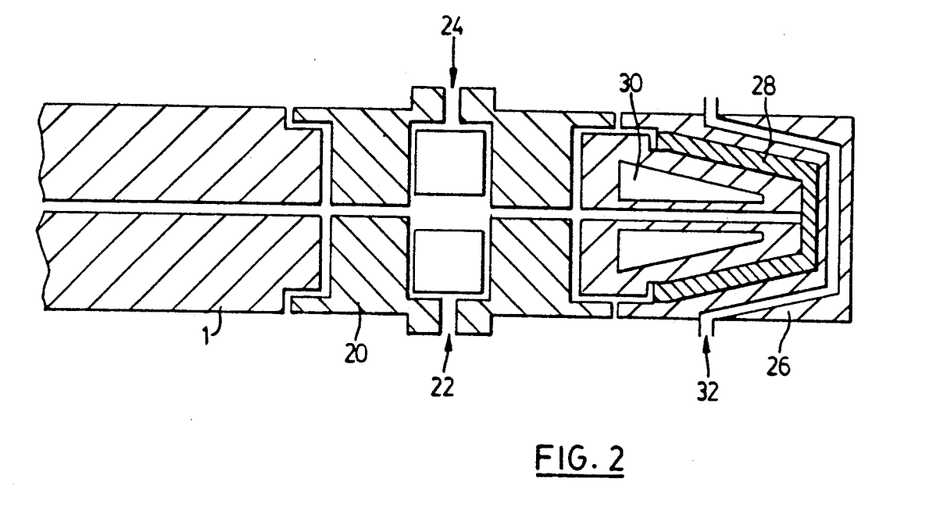
FIG. 2 is a schematic drawing showing a die/press moulding system for producing a rigid biodegradable, edible food container.
Figure 3:
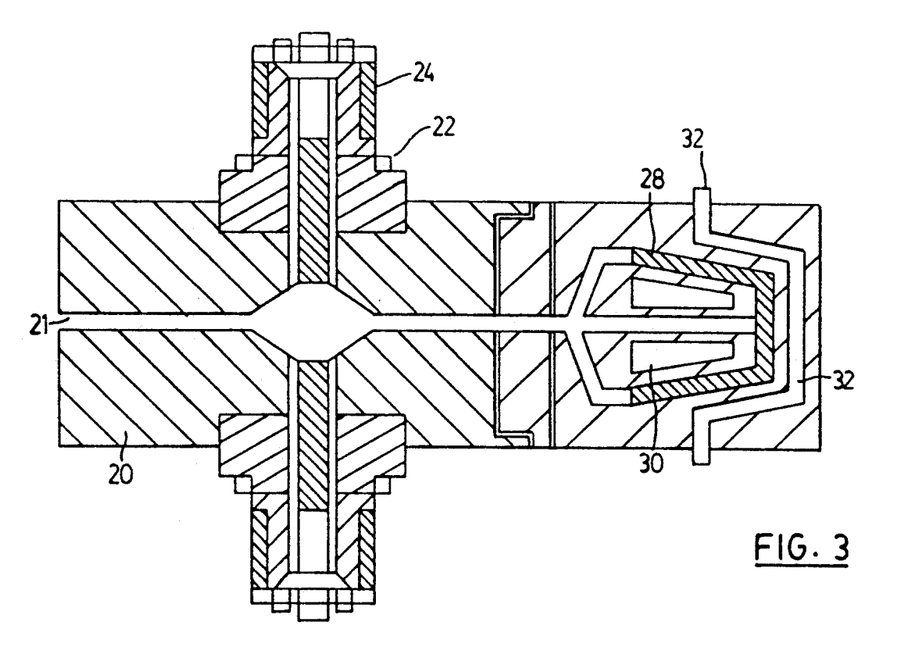
FIG. 3 is a drawing showing the die/press moulding apparatus of the invention.

The steps in the extrusion moulding process may be better understood by reference to FIG. 2 which is a schematic drawing of the die/press molding system. FIG. 3 is a detailed drawing of the apparatus. In the extrusion cooker 13 the ingredients are mixed, cooked and expanded to form a puffed extrudant. The screw rotational motion and cooker internal pressure push the extrudant into the next stage.

In the next stage, the die adaptor 20 and injector 22, receives the puffed extrudant (temperature of 258°-287° F.; moisture content of 10-20%, an expansion factor of 400-500%, and a pressure of 3,000 to 35,000 psi). The extrudant is injected/pumped by means of external pressure system 24 into the molding press 26. The external pressure system 24 is preferably a high pressure pump with a piston such as the dual piston pump manufactured by Cole-Parmer, (100 rpm, 5,000–12,000 psi, 20°–200° F.). In the molding press 26 the expanded extrudant is formed into the desired three dimensional shape of the container 28 and the interior surface of the container is coated, with cold or hot die/molding compression as more particularly described below. A steam or electric heating unit 30 and a water cooling unit 32 provide the heat or cooling required. The cold die is maintained at a temperature of 20°–40° C. and the hot die at a temperature of 100°–160° C. The die form press is operated under a pressure of from 5,000–30,000 psi. In particular, a coating material, preferably a water repellant may be incorporated into the starting ingredients and a coating may be formed on the interior surface of the container 28 by heating at a temperature of 100°–160° C. using the steam or electric heating unit 30 under a pressure of 5,000–30,000 psi. The die is then cooled using the water cooling unit 32.

Examples of suitable water repellants include cellulose such as ethyl cellulose; proteins, such as casein, gluten and zein; and alginates such as sodium and calcium alginate and in particular water repellants sold under the trade marks Algin (Prescott Company), Ethocel (Dow Chemicals), Prolait (Charles Tennant), Modglut (Ogilvie Mill), and Zein (Freeman Industries). The water repellant preferably casein, gluten or zein, may be incorporated into the starting ingredients and a water repellant coating may be formed on the interior surface of the container 28 as described above. Alternatively, the water repellant may be spray coated onto the formed container by powder or liquid spray coating methods using conventional techniques (see for example Finishing Guidebook 1988, Metal Finishing Magazine; Deposition Technologies for Film and Coatings, Roinstan F. Banshah; Metal handbook Vol. 2, American Society of Metal; Chemical Engineer's Handbook, Robert H. Perry. Preferably water repellants such as Ethocel ® and alginate are employed in the latter method.

The shaped articles produced in accordance with the process of the invention are sufficiently rigid, impermeable and water repellant to hold moist or fatty whole foods and liquids, including cold or hot beverages. The material which forms the walls of the shaped articles has a light and expanded or puffed texture, similar in nature to that of the polystyrene foam commonly employed in disposable coffee cups and food trays. Unlike polystyrene products, the containers of the present invention may be made from natural products and are completely biodegradable and edible. The puffed nature of the shaped articles of the invention provides a light weight product which can be used to insulate hot or cold foods and beverages, such as coffee, hamburgers, ice cream and cold drinks. The shaped articles can take a wide variety of forms, including, but not limited to, containers, boxes, cups, lids, plates, trays and straws.

EXAMPLE 1

A range of formulations as shown in Table III were tested using the above described process and the conditions set forth in Tale VI, employing the eight basic ingredients of corn flour, potato flour, rice flour, wheat flour, corn starch, potato starch, tapioca starch and wheat starch, to determine the preferred formulations for preparing rigid packaging material. The preferred formulations are shown in Table IV.

The particular formulations shown in Table V were processed as generally described above to obtain a mixture with particles having a mesh size of 200 and a moisture content of 11% by weight. A dry feeder was used to meter each formulation and the extruder and screw configuration were set up to include a mixing zone for the raw materials. The ingredients were cooked in a MPG 50/35 extrusion cooker (APV Baker Inc.) with a co-rotating twin screw using the conditions set forth in Table VI with the extruder screw in configuration 2 as detailed in Table VI. Preferably, the procedure was carried out under a pressure of 250 psi, moisture content of 22.5%, feed rate of 100 lb/hour for 35 seconds. A total of 6 zones of extruder-barrel were utilized and each zone temperature was set up to cook/expand in the extruder. The screw ratio was 15:1 and the temperatures increased from 80° F. in zone 1° to 280° F. in zone 6. Water was injected into the mixing zone of the extruder with a water pump. The degree of expansion of the extrudant depended on the amount of water infused.

The cooled expanded extrudant was fed into the die adaptor and injector (dual piston pump manufactured by Cole-Parmer, 100 rpm, 5,000–12,000 psi) at a temperature of about 260° F., a moisture consistent of 10–20% and an expansion factor of 400–500%. The adaptor and injector was powered either by a hydraulic or by a pneumatic compression system maintained at a temperature of 258°–287° F. and a pressure of 5,000 psi. The adaptor and injector injected the expanded extrudant into the molding, or die/form press. The die/form press was maintained at a pressure of 12,000 psi. The three dimensional shaped containers were formed in the die/form press, which was steam heated to 310° F. and water cooled to 80° F. in alternate cycles. The heat and pressure in the die/form press formed the water-repellant coating (about 20 ml thickness) in these formulations which incorporated casein, zein, or gluten as the coating material.

In an alternative procedure the water repellant was coated on the pre-molded product. In this case Ethocel ® or alginate was coated on the product by powder or liquid spray coating methods (nozzle press- —100 psi).

The formed containers were dried in an electrical or gas powered oven for 3.5 minutes at 280° F.

The containers were tested for moisture content (AACC 44-15A, Sartorius MA 30), thickness/expansion degree (ASTM D-1005-84, Fowler micrometer), insulation (ASTM C-177-85, Thermal conductivity Tester manufactured by Holometrix, type K-Matic/Rapid K, 0.5–100), compression strength (ASTM D-695-89, Chatillon/BG 100), density (ASTM D-792-86, Satorius B120 S) and water resistance (ASTM D-870-87, Precision Bath/tank manufactured by Cole-Parmer, Digital type, 68°–302° F., 14 liter). The stability of the containers was tested using an oven heating technique. The containers were placed in an oven, the temperature was increased in 5° F. increments from room temperature, and the temperature at which decolorization and cracking occurred was recorded. The colour, odour and flavour of the materials was also noted. The results are shown in Table VI.

An aluminum plate/tray, a paper cup (Canada Cup, Lily Cup, Canada) a paper plate/tray (CKF), a plastic cup (Canada Cup, Lily Cup, Canada) and a plastic plate/tray were tested for thickness, compression strength, insulation strength, density, water resistance, and stability using the same methods as used for the test formulations. The results are shown in Table VIII. A comparison of the results shown in Table VI and VIII indicates that the properties of the tested formulations were similar to the properties of the plastic materials tested.

LEGEND TO FIG. 3

NO. 1 ... HYDRAULIC/PNEUMATIC PRESSURE INLET
NO. 2 ... OUTLET TO COMPRESSOR
NO. 3 ... PISTON
NO. 4 ... DIE-CAVATIES
NO. 5 ... COOLED WATER INLET
NO. 6 ... WARMED WATER OUTLET
NO. 7 ... DIE ADAPTER/INJECTOR
NO. 8 ... DIE/MOLD PRESS
NO. 9 ... CUP
NO. 10 ... EXTRUDANT INLET FROM COOKING EXTRUDER
NO. 11 ... COOLANT
NO. 12 ... HEATING MEDIUM

TABLE I

| Punction of Additive | Suitable Additives |
|---|---|
| Softening | Syrup, sugar, sorbitol, glycerol, glucose, sodium lactate, mannitol & others |
| Firming agent | Aluminium & calcium sulphate, calcium phosphate, chloride, gluconate & others |
| Anti-sticking agent | Silicate of sodium, calcium, calcium-aluminium, magnesium oxide & others |
| anti-staling agent | Sucrose, sucrose acetate isobutyrate & others |
| Anti-oxidant | Citric & benzoic acid derivatives, sorbic acid & sorbic sodium, calcium, potassium salt, ascorbic acid & ascorbic acid sodium, calcium salt & others |

TABLE II

TYPE OF FLOUR AND STARCH

| Type | Grade | Particle size (mesh) | Moisture (%) | pH | Color | Flavor | Odor |
|---|---|---|---|---|---|---|---|
| Flour | | | | | | | |
| Corn | A | 150 | 11.0–13.0 | 4.5/6.0 | white | good | good |
| Potato | A | 150 | 8.0–10.0 | 5.0/7.0 | white | good | good |
| Rice | No. 1 | 200 | 8.5–13.0 | 5.0/7.0 | white | good | good |
| Tapioca | No. 1 | 150 | 10.0–14.0 | 5.0/6.5 | white | good | good |
| Wheat | A | 150 | 13.8–14.2 | 5.0/7.0 | white | good | good |
| Starch | | | | | | | |
| Corn | A | 200 | 11.0–12.0 | 4.5/5.5 | white | good | good |
| Potato | A | 150 | 10.0–21.0 | 5.0/7.0 | white | good | good |
| Tapioca | No. 1 | 150 | 10.0–14.0 | 5.0/6.5 | white | good | good |
| Wheat | A | 250 | 11.0–12.0 | 5.0/7.0 | white | good | good |

TABLE III

TESTING FORMULATION FOR RIGID MATERIALS

| FLOUR | STARCH CORN | TAPIOCA | WHEAT | ADDITIVES | WATER |
|---|---|---|---|---|---|
| CORN | | | | | |
| 40–100 | 20–60 | | | 0–10 | 15–25 |
| 40–100 | | 20–60 | | 0–10 | 15–25 |
| 40–100 | | | 20–60 | 0–10 | 15–25 |
| POTATO | | | | | |
| 40–100 | 20–60 | | | 0–10 | 15–25 |
| 40–100 | | 20–60 | | 0–10 | 15–25 |
| 40–100 | | | 20–60 | 0–10 | 15–25 |
| RICE | | | | | |
| 40–100 | 20–60 | | | 0–10 | 15–25 |
| 40–100 | | 20–60 | | 0–10 | 15–25 |
| 40–100 | | | 20–60 | 0–10 | 15–25 |
| WHEAT | | | | | |
| 40–100 | 20–60 | | | 0–10 | 15–25 |
| 40–100 | | 20–60 | | 0–10 | 15–25 |
| 40–100 | | | 20–60 | 0–10 | 15–25 |

TABLE IV (PERCENT BY WEIGHT)

| FORMULATION NO. I | |
|---|---|
| Wheat flour | 75–85% |
| Corn starch | 14–24% |
| Additives | 01–10% |
| Moisture | 20–23% |
| FORMULATION NO. II | |
| Wheat flour | 75–85% |
| Wheat starch | 14–24% |
| Additives | 01–10% |
| Moisture | 20–23% |
| FORMULATION NO. III | |
| Corn flour | 75–85% |
| Corn starch | 14–24% |
| Additives | 01–10% |
| Moisture | 20–23% |
| FORMULATION NO. IV | |
| Corn flour | 75–85% |
| Wheat starch | 14–24% |
| Additives | 01–10% |

TABLE V

RIGID BIODEGRADABLE/EDIBLE MATERIAL FORMULATIONS (IDEAL)

| Formulation A | |
|---|---|
| Wheat flour | 74% |
| Wheat gluten | 1% |
| Corn starch | 20% |
| Sorbitol | 2% |
| Sucrose | 1% |
| Sod Ascorbate | 1% |
| Moisture | 23% |
| Formulation B | |
| Wheat flour | 75% |
| Wheat gluten | 2% |
| Wheat starch | 22% |
| Mannitol | 1% |
| Sucrose | 1% |
| Cal Sorbate | 1% |
| Moisture | 22% |
| Formulation C | |
| Corn flour | 70% |
| Corn starch | 24% |
| Casein | 2% |
| Glycerol | 2% |
| Sod Benzoate | 2% |
| Moisture | 20% |
| Formulation D | |
| Corn flour | 71% |
| Wheat Starch | 25% |
| Zein | 2% |
| Sod Lactate | 1% |
| Cal Ascorbate | 1% |
| Moisture | 22% |

TABLE VI

TECHNICAL INFORMATION

Barrel

| | | | | | | |
|---|---|---|---|---|---|---|
| Ratio | 15:1 | | | | | |
| Moisture | 20–23% | | | | | |
| Pressure | 200–300 psi | | | | | |
| Temperature | 80–280 F. | | | | | |
| Zone | 1 | 2 | 3 | 4 | 5 | 6 |
| Set (F) | 80 | 80 | 160 | 180 | 240 | 280 |
| Actual (F) | 80 | 77 | 161 | 178 | 240 | 280 |
| Residence time (sec) | 5 | 5 | 5 | 5 | 5 | 5 |

Screw

Speed: 150–350 rpm
Configuration: #1–#3

| Configuration | #1 | #2 | #3 |
|---|---|---|---|
| Spacer | 10D | 10D | 10D |
| Bearing | 2D | 2D | 2D |
| Spacer tube | 8D | 8D | 8D |
| Feed Screw | 4.5D | 4.5D | 4.5D |
| Forwarding | 7 × 30 | 7 × 30 | 7 × 30 |
| Single lead | 2D | 1D | 1D |
| For | — | 3 × 60 | 3 × 60 |
| Rev | 3 × 30 | 3 × 30 | 3 × 30 |
| Single lead | 1.5D | 1D | 1D |
| For | 2 × 60 | 3 × 60 | 3 × 60 |
| Rev | 2 × 30 | 3 × 30 | 3 × 30 |
| Single lead | 1D | 1D | 1D |
| For | — | 3 × 60 | 3 × 60 |
| Rev | — | 3 × 30 | 3 × 30 |
| Single lead | — | 1D | 1D |
| For | — | 3 × 60 | 3 × 60 |
| Rev | — | 3 × 30 | 3 × 30 |
| Single lead | — | 1D | 1D |
| For | — | — | 3 × 60 |
| Rev | — | — | 3 × 30 |
| Single lead | — | — | 1D |

TABLE VII

RIGID BIODEGRADABLE/EDIBLE PACKAGING MATERIAL TEST

| TEST NO. | MOISTURE | THICKNESS | EXPANSION DEGREE | COMPRESSION STRENGTH | INSULATION STRENGTH | DENSITY |
|---|---|---|---|---|---|---|
| I-A | 15.35% | 236 mil | 400% | 50 MPa | 3.5 | 0.4532 g/cc |
| II-A | 10.69 | 250 | 500 | 46 | 4.1 | 0.7724 |
| III-A | 16.37 | 160 | 400 | 52 | 2.8 | 0.3550 |
| I-B | 15.76 | 167 | 300 | 45 | 3.6 | 0.2869 |
| II-B | 10.30 | 117 | 300 | 37 | 2.0 | 0.5509 |
| III-B | 11.54 | 195 | 400 | 41 | 2.9 | 0.5061 |
| I-C | 12.57 | 126 | 400 | 49 | 2.5 | 0.3332 |
| II-C | 16.82 | 93 | 400 | 53 | 2.1 | 0.1037 |
| III-C | 12.40 | 144 | 500 | 50 | 4.0 | 0.0991 |
| I-D | 18.65 | 81 | 350 | 58 | 2.6 | 0.5213 |
| II-D | 13.98 | 102 | 450 | 43 | 3.5 | 0.0762 |
| III-D | 16.98 | 139 | 400 | 33 | 4.6 | 0.0633 |

| TEST NO. | WATER RESISTANCE | COLOR | ODOUR | FLAVOUR | STABILITY |
|---|---|---|---|---|---|
| I-A | good | white | neutral | neutral | 326F |
| II-A | good | white | neutral | neutral | 321 |
| III-A | good | white | neutral | neutral | 325 |
| I-B | good | white | neutral | neutral | 321 |
| II-B | good | white | neutral | neutral | 320 |
| III-B | good | white | neutral | neutral | 338 |
| I-C | good | white | neutral | neutral | 340 |
| II-C | good | white | neutral | neutral | 318 |
| III-C | good | white | neutral | neutral | 336 |
| I-D | good | white | neutral | neutral | 317 |
| II-D | good | white | neutral | neutral | 320 |
| III-D | good | white | neutral | neutral | 318 |

TABLE VIII

COMPATIBLE RIGID MATERIAL AGAINST RIGID BIODEGRADABLE/EDIBLE PACKAGING MATERIAL TEST DATA

A = Aluminium; P = Paper; Pl = Plastic; C = Cup; P/T = Plate/Tray

| TEST NO. | MOISTURE | THICKNESS | EXPANSION DEGREE | COMPRESSION STRENGTH | INSULATION STRENGTH | DENSITY |
|---|---|---|---|---|---|---|
| A.P/T | — | 4.0 mil | — | 95 MPa | 65 | 2.0596 |

TABLE VIII-continued

| | | | | | | |
|---|---|---|---|---|---|---|
| P.C | — | 8.0 mil | — | 17 MPa | 10 | 1.0527 |
| P.P/T | — | 22.0 mil | — | 35 MPa | 6 | 0.6269 |
| Pl.C | — | 94.0 mil | — | 23 MPa | 3 | 0.0472 |
| Pl.P/T | — | 68.0 mil | — | 40 MPa | 4 | 0.0691 |

| TEST NO. | WATER RESISTANT | COLOR | ODOUR | FLAVOUR | STABILITY °F. |
|---|---|---|---|---|---|
| A.P/T | good | metallic | — | — | 1200 |
| P.C | poor | white | — | — | 335 |
| P.P/T | poor | white | — | — | 350 |
| Pl.C | good | white | — | — | 371 |
| Pl.P/T | good | white | — | — | 363 |

I claim:

1. A composition suitable for forming into shaped articles without any additives, the composition being produced by a process comprising preparing a mixture of flour and starch wherein the flour and starch have a uniform particle size and wherein the composition contains 40 to 80% by weight flour, 20 to 60% by weight start, and 15 to 25% by weight water; and heating and mixing the mixture under a sufficient pressure, temperature and moisture content and for a sufficient period of time such that when the pressure is decreased the mixture expands to form a composition which when cooled is rigid and stable over a set temperature range.

2. A pellet formed by: preparing a mixture of flour and starch wherein the flour and starch have a uniform particle size, and wherein the mixture contains 40 to 80% by weight flour, 20 to 60% by weight starch, and 15 to 25% by weight water; heating and mixing the mixture in an extrusion cooker under sufficient pressure, temperature and moisture content and for a sufficient period of time such that the resulting material does not expand when it is extruded from the extrusion cooker.

3. The pellet as claimed in claim 2, wherein the moisture content is 10-12%, the temperature is 240°-280° F. and the pressure is 50-100 psi.

* * * * *